H. WAGONER.
CORN-PLANTER.
No. 189,156. Patented April 3, 1877.
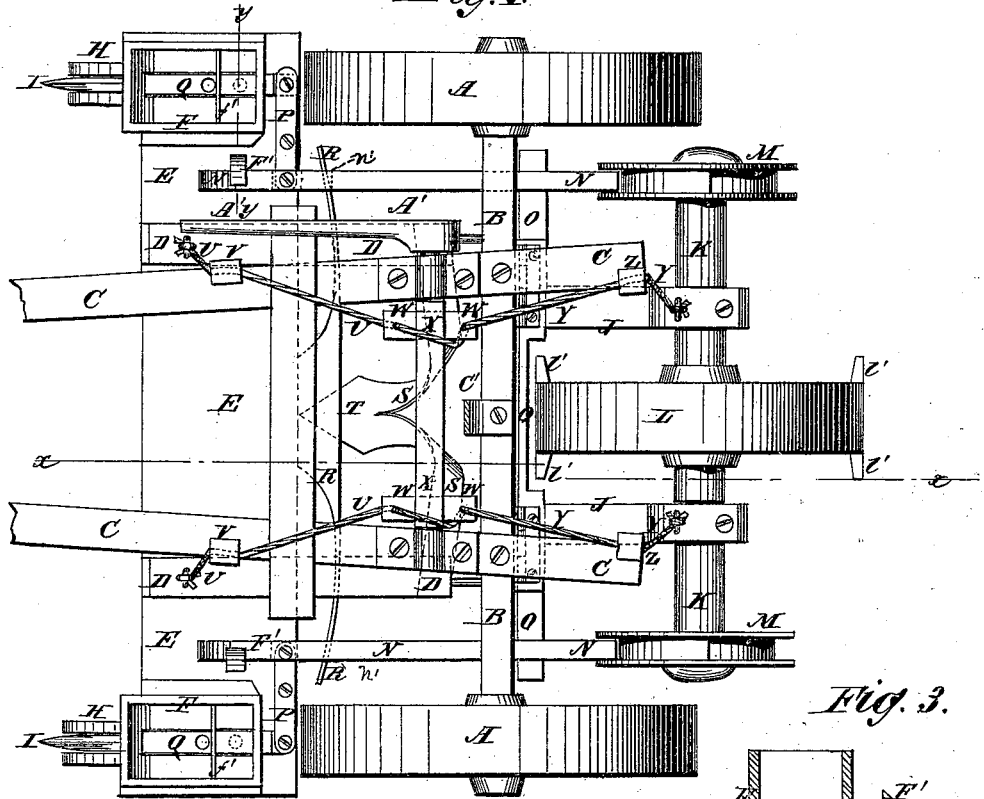
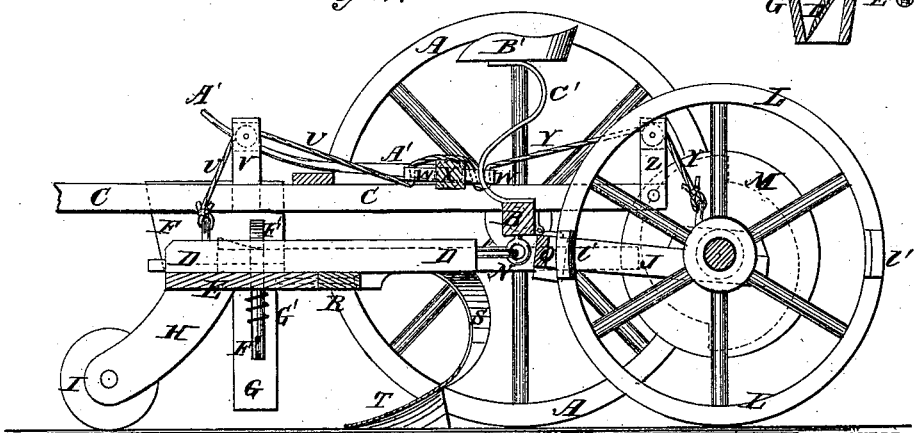
WITNESSES:
Francis McArdle,
Alex F. Roberts
INVENTOR:
H. Wagoner
BY
[signature]
ATTORNEYS.

UNITED STATES PATENT OFFICE.

HARRISON WAGONER, OF COSHOCTON, OHIO.

IMPROVEMENT IN CORN-PLANTERS.

Specification forming part of Letters Patent No. 189,156, dated April 3, 1877; application filed January 19, 1877.

*To all whom it may concern:*

Be it known that I, HARRISON WAGONER, of Coshocton, in the county of Coshocton and State of Ohio, have invented a new and useful Improvement in Corn-Planters, of which the following is a specification:

Figure 1 is a top view of my improved machine. Fig. 2 is a vertical longitudinal section of the same, taken through the line $x\ x$, Fig. 1. Fig. 3 is a detail section, taken through the line $y\ y$, Fig. 1.

Similar letters of reference indicate corresponding parts.

The object of this invention is to furnish an improved planter, which shall be so constructed as to open a channel to receive the seed, drop the seed at uniform distances apart, cover the seed, and mark the rows, so that the planting may be done in accurate check-row.

The invention will first be described in connection with the drawing, and then pointed out in the claims.

A are the wheels, which revolve upon the journals of the axle B, the rims of which are made wide, so as to serve as rollers for covering the seed. C are the thills, which are attached to the axle B, and the rear ends of which project in the rear of the said axle. To the axle B, beneath the thills C, are hinged the rear ends of two bars, D, to the forward parts of which is attached a board, E. To the upper sides of the ends of the board E are attached the seed-hoppers F. To the lower sides of the ends of the board E are attached the spouts G, through which the seed passes to the ground, and the standards H of the cutters I that open the channels to receive the seed. The cutters I are made thicker in the center, and are rounded to an edge at their rims, so as to pack the sides of the channels and prevent them from being partly filled by the falling in of the soil before the seed has been deposited in them. To the axle B, beneath the thills C, are hinged the forward ends of two bars, J, to the rear ends of which are attached the bearings for the shaft K. To the center of the shaft K is attached a wheel, L, the circumference of which is equal to twice the required distance apart of the hills. To the side edges of the opposite parts of the rim of the wheel L are attached blocks $l'$, to mark the ground between the hills, and enable the field to be planted in accurate check-row. To the ends of the shaft K are attached two wheels, M, upon the faces of which are formed two cams or inclines, against which rest the rear ends of the bars N, so that the said bars N may receive a longitudinal movement from the revolution of the said wheels L. The cam-wheels M are flanged, to prevent the ends of the bars N from slipping from their faces. The bars N rest upon the ends of a cross-bar, O, attached to the forward ends of the hinged bars J. The forward ends of the bars N rest and slide upon the board E, and to said bars N, near said forward ends, are pivoted the inner ends of two short levers, P, the middle parts of which are pivoted to the said board E, and to the outer ends of which are pivoted the rear ends of the dropping-slides Q. The dropping-slides Q pass through holes in the lower part of the hoppers F, and work in grooves in the bottoms of said hoppers. The hoppers F are divided into two unequal compartments by a partition, $f'$, so that the dropping-slides Q may receive seed from the larger compartment, carry it into the smaller compartment, and allow it to drop through the spout G to the ground, the partitions $f'$ serving as a cut-off to prevent any more seed being carried out by the said slides than enough to fill their dropping-holes. The sliding bars N are held back against the cam-wheels M by the springs R, attached to the board E, and which bear against shoulders or other stops $n'$, formed upon or attached to the said bars N.

By this construction the dropping-slides Q are drawn back to drop the seed with a slow movement, and are pushed forward to again receive seed with a quick movement, so as to jar the seed and insure the filling of their dropping-holes.

In the spouts G are placed valves D', which receive the seed from the dropping-slides Q, and hold it until operated to drop it to the ground. To the valves D' are attached rods E', which pass out through the inner sides of the spouts G, and their outer ends are attached to the lower ends of pins F'. The pins F' are held down by spiral springs G', placed upon their lower parts, and the upper ends of which rest against the lower side of the board E. The upper ends of the pins F have L-heads formed upon them, which rest upon the bars N, so that the said pins may be operated, to open the valves D' and drop the seed, by inclines formed upon said bars N as they are moved to operate the dropping-slides Q. To the rear parts of the hinged bars D is attached the branched upper end of the standard S, to the lower end of which is attached, or upon it is formed, a plow or scraper, T, to remove clods and lumps, and form a smooth path for the measuring-wheel L. To the forward ends of the hinged bars D are attached the ends of cords U, which pass through holes formed in studs V, or over guide-pulleys pivoted to said studs, which are attached to the thills C, said cords being attached to the forward ends of cross-bars W, which are secured to the shaft X, which works in bearings attached to the thills C. To the rear ends of the cross-bars W are attached cords Y, which pass through guide-holes formed in studs Z, or around guide-pulleys pivoted to said studs, the studs Z being attached to the rear ends of thills C. To one end of the shaft X is attached a lever, A', so that by operating the said lever A' the measuring-wheel L and the opening-cutters I may be raised from the ground, and the operation of the seed dropping device stopped. B' is the driver's seat, the standard C' of which is attached to the axle B.

Having thus described my invention, I claim as new and desire to secure by Letters Patent—

1. The combination of the studs V Z, the cords U Y, the cross-bars W W, the shaft X, and the lever A', with the thills C and the hinged bars D J, substantially as herein shown and described.

2. The combination of rods E', slide-pins F', and springs G', with the dropper-slide bars N and spout-valves D', as and for the purpose specified.

HARRISON WAGONER.

Witnesses:
J. S. ELLIOTT,
JOHN WAGONER.